Dec. 19, 1961          R. C. BRAMMER          3,013,757
                     FOLDING OIL DRUM RACK
Filed April 1, 1960                          2 Sheets-Sheet 1
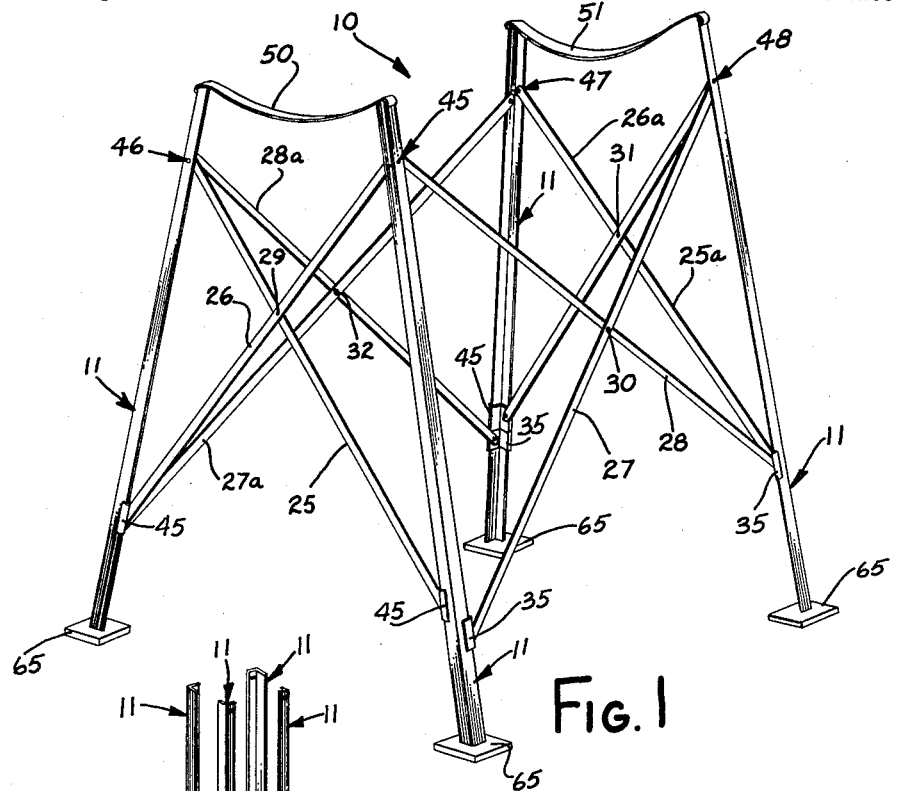
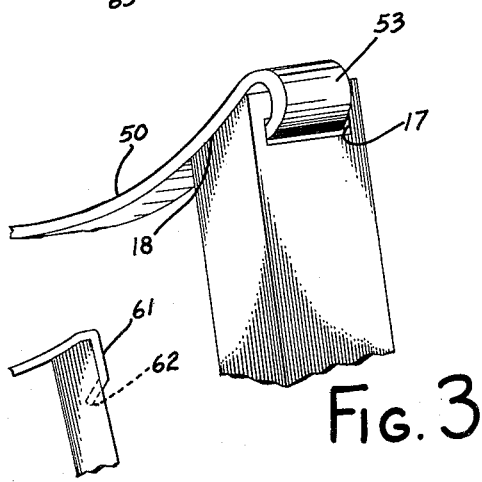
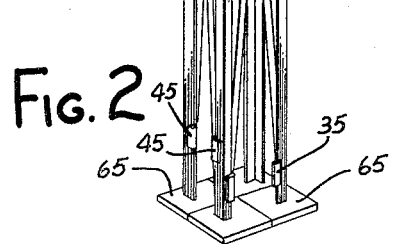
INVENTOR
ROBERT C. BRAMMER
BY *Price and Heneveld*
ATTORNEYS Dec. 19, 1961 R. C. BRAMMER 3,013,757
FOLDING OIL DRUM RACK
Filed April 1, 1960 2 Sheets-Sheet 2

INVENTOR
ROBERT C. BRAMMER
BY *Price and Heneveld*
ATTORNEYS

# United States Patent Office 3,013,757
Patented Dec. 19, 1961

3,013,757
FOLDING OIL DRUM RACK
Robert C. Brammer, Traverse City, Mich., assignor to Stromberg-Carlson Products, Inc., Traverse City, Mich., a corporation of Michigan
Filed Apr. 1, 1960, Ser. No. 19,241
3 Claims. (Cl. 248—150)

This invention relates to a rack for supporting drums and more particularly to a folding rack for supporting drums.

With the growing number of mobile homes, cottages, and outdoor campers, there is a growing need for a collapsible rack for supporting drums, such as oil drums. This is true since all of these modes of living require heat, and fuel for cooking, which is ordinarily furnished from fuel oil stored in drums which are supported by some type of rack.

Most of the oil drum racks sold on the market today are of the type that must be assembled with some type of fastener, such as nuts and bolts. The assembly of this type of rack requires tools to secure the fasteners into position. The assembly of such a rack is time-consuming. Often rather elaborate instructions are necessary to instruct the user on how to assemble the rack. If the rack is to be used for only a short interval of time, it is also time-consuming to disassemble the rack.

The present invention solves many of these problems by providing a drum rack which is collapsible or folding. Thus, the drum rack of this invention can be assembled or disassembled within a matter of minutes. The assembly and disassembly can be accomplished without the use of any tools. The folding drum rack of this invention is of rugged construction and can either be used as a portable device for supporting drums, or it may be installed and used as a permanent rack for supporting drums.

It is an object of this invention to disclose a drum rack which is collapsible.

Another object of this invention is to provide a drum rack which can be assembled and disassembled readily.

Still another object of this invention is to provide a drum rack which can be assembled and disassembled without the need for tools.

Still another object of this invention is to provide a drum rack which can be assembled by the average householder without having to follow complicated instructions.

Still another object of this invention is to provide a drum rack which disassembles into a compact, easily portable unit.

Other objects of this invention will become obvious upon reading the following specification in conjunction with the accompanying drawings.

In the drawings:

FIG. 1 is a perspective view of the folding drum rack in the expanded, assembled position;

FIG. 2 is a perspective view of the folding drum rack in the collapsed, disassembled position;

FIG. 3 is a perspective view of the connection between the drum support strap and a leg;

FIG. 4 is a perspective view of the modified form of connector between a drum support strap and a leg;

Figure 5:
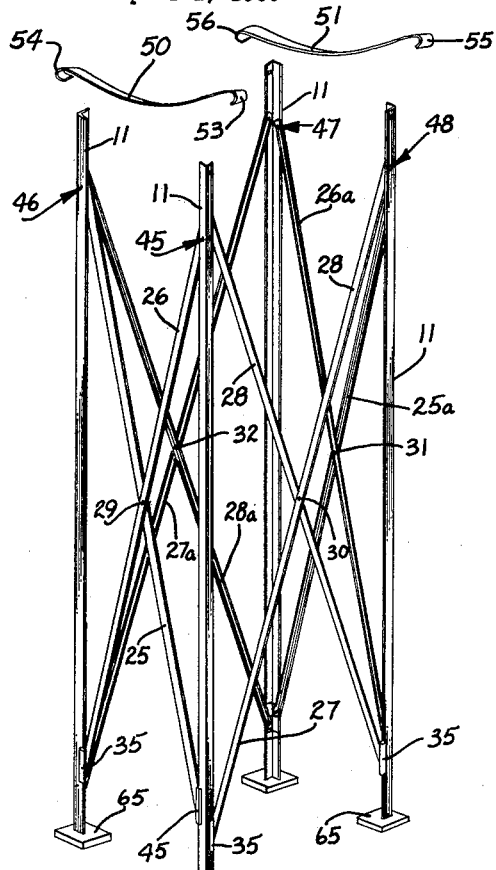
FIG. 5 is a perspective view of the folding drum rack in a semi-collapsed position, showing the barrel support straps in exploded position.

This invention relates basically to a folding rack which is utilized for supporting an oil drum. The rack includes vertically disposed legs which are positioned in a quadrangular position. The legs are secured together into a unit by scissor-like cross-braces secured to the upper extremities of each of the legs. Vertically movable slides are disposed on the lower extremities of the legs, and the cross-braces are pivotally secured to the slides. The rack is allowed to expand due to the combination of the scissor-like cross-braces and the slides which are movably mounted on the legs. As the legs expand or move away from each other, the braces pivot and the slide members slide up on the legs, allowing the expansion. The legs are provided with stops which limit the amount of travel of the slides on the legs and thus the extension of the rack. The drum is supported by straps which are connected between the legs. The straps are connected to the legs by snap-on type connectors.

The folding rack drum assembly is designated generally as 10. The assembly 10 includes the legs 11, cross-braces 25 through 28, and 25a through 28a, slides 35 and 45 mounted on the legs, drum support straps 50 and 51, and leg base plates 65.

Figure 7:
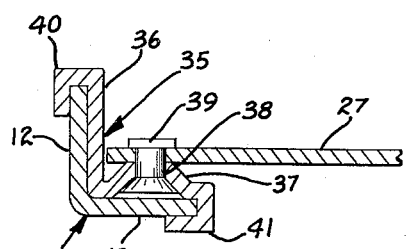
FIG. 7 is a cross sectional view taken along the section lines VII—VII of FIG. 6.

The legs 11 of the assembly 10 are best shown in FIGS. 1 and 7. The legs 11 are of angular shape in cross section, having transverse flanges 12 and 13. The transverse flanges 12 and 13 are of equal dimension. The legs 11 are of considerable longitudinal extent so as to support the drum a sufficient distance from the ground surface.

Figure 9:
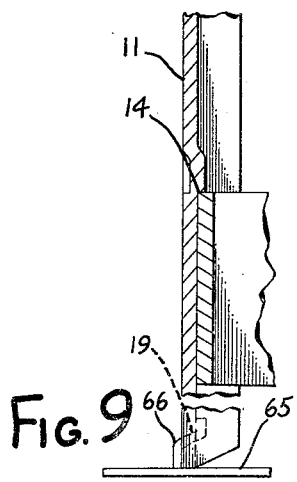
FIG. 9 is a cross sectional view taken along the section lines IX—IX of FIG. 6, and also showing the base plate connection to a leg.

The upper extremities of the legs 11 are provided with strap opening 17 for purposes which will be described more fully hereinafter. The lower extremities of the legs 11 are provided with base plate apertures 19 (FIG. 9). The purpose of the base plate apertures will be described more fully subsequently. The tops of the legs have contoured surfaces 18 which correspond to the contour of the drum straps 50 and 51.

Spaced approximately one-fourth the distance from the lower extremities of the legs 11 are stop members 14 (FIG. 9). The stop members 14 are shoulders which are formed in one of the flanges 12 or 13 of the legs 11 and project inwardly so as to prevent upward movement of the slides 45 beyond the stop members 14, as will be explained more fully under "Operation."

Figure 8:
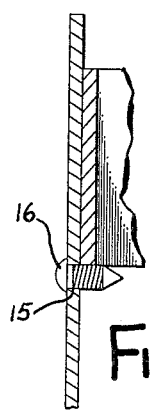
FIG. 8 is a cross sectional view taken along the section lines VIII—VIII of FIG. 6.

Spaced below the stops 14 on the legs 11, at a distance equal to the combined widths of the slides 45 and 35, are lock pin apertures 15 (FIG. 8). When the legs are in the fully expanded position, the slides 45 will abut the slides 45. Lock pins 16 are inserted in the apertures 15 and prevent further movement of the slides, positively locking the rack in the extended position.

Figure 6:
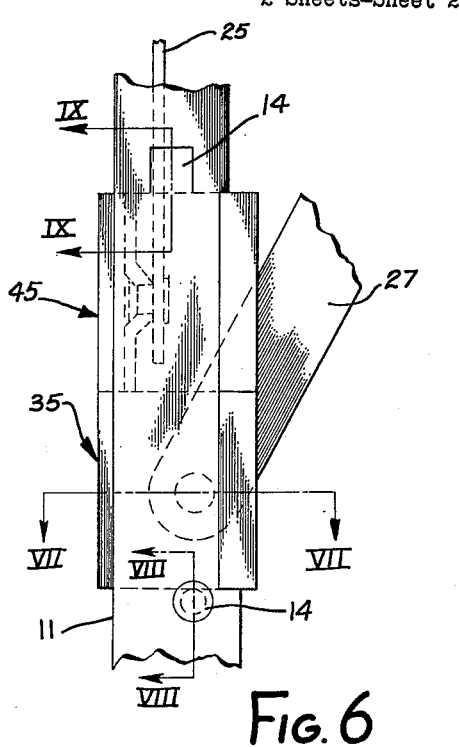
FIG. 6 is a segmental, elevational view of one of the legs, showing the slide members in the assembled position.

Each leg 11 of the assembly 10 is provided with a pair of slides 35 and 45, best shown in FIG. 6. Since each of the slides 35 are similar, only one of the slides will be explained in detail.

FIG. 7 shows a cross sectional view of the slide 35. It is a generally angular shaped member having a transverse arm 36 and a transverse arm and rivet casing 37. The transverse arms 36 and 37 lie adjacent the transverse flanges 12 and 13, respectively, of leg 11.

Formed integral with the transverse arm 36 is a hook-like guide lip 40 which surrounds the end of the transverse flange 12, and secures the slide 35 to the leg 11. A similar hooklike guide lip 41 is formed integral with the transverse arm and rivet casing 37 and surrounds the end of the transverse flange 13. Thus, the guide lips 40 and 41 maintain the slide 35 in bearing contact with the leg 11.

The transverse arm and rivet casing 37 is cup-shaped, as viewed in FIG. 7, is adapted to house the head of the rivet 39, and has a rivet aperture 38 through which the shank of the rivet 39 extends. The cross-brace 27 is pivotally mounted on the shank of the rivet 39. The cross-brace 27 is secured in position by expanding the base of the rivet 39.

As shown in FIG. 6, the slide 45 is mounted above the slide 35. The slide 45 is similar in configuration to that of slide 35, and therefore will not be explained in detail. However, the slide 45 is mounted on the leg 11 reverse to that of slide 35 so that if viewed in the FIG. 7 position, the guide lip 41 will surround the transverse flange 12, and the guide lip 40 will surround the transverse flange 13. In this manner the transverse arm and rivet casing 37 will lie adjacent the intersurface of transverse flange 13 rather than transverse flange 12 as shown in FIG. 7. As previously stated, this is accomplished by merely reversing the manner of applying the slide to the leg. Otherwise, the slides 35 and 45 are identical when removed from the legs. The slide 45, as shown in FIG. 6, has a cross-brace 25 pivotally secured thereto.

The slides 35 and 45 are allowed to slide between the stops 14 and the base plates 65 mounted on the bottom of the legs 11. Secured to a separate one of each of the slide members 45 are end cross-braces 25 and 26, and 25a and 26a. These cross-braces are pivotally secured to the slides 45 in a manner as shown in FIG. 6. The cross-braces 25 and 26 overlap each other and are pivotally joined together by a pivotal connection 29, best shown in FIG. 1. In this manner the cross-braces 25 and 26 form a scissorlike unit. The upper extremities of the cross-braces 25 and 26 are pivotally secured to the upper extremities of legs 11 at pivotal connection points 46 and 45, respectively. The cross-braces 25a and 26a are also overlapped and joined together by a pivotal connection 31. The upper extremities of the braces 25a and 26a are secured to the upper extremities of the other legs 11 at pivotal connection points 47 and 48, respectively. The cross-braces 25a and 26a likewise form a scissorlike unit.

Secured to a separate one of each of the slides 35, slidably mounted on the legs 11, are cross-braces 27, 28, and 27a, 28a. The cross-braces 27 and 28 cross and overlap each other and are joined by a pivotal connector 30. The upper extremities of the cross-braces 27 and 28 are secured to pivotal connection 48 and 45 on the legs 11. The cross-braces 27a and 28a cross and overlap, being joined together by pivotal connector 32. The upper extremities of these cross-braces are secured to pivotal connections 47 and 46 on the legs 11.

The legs 11 are tied together by the various cross-braces in a manner that results in a device of a generally quadrangular configuration.

FIG. 1 shows drum support straps 50 and 51 in the assembled position. FIG. 5 shows the strap hooks 53 and 54 formed on the end of strap 50 and the strap hooks 55 and 56 formed on opposite ends of the drum support strap 51. The drum support straps 50 and 51 are of sufficient length to extend between the legs 11 for supporting a drum (not shown). The drum support straps 50 and 51 are secured to the legs 11 of the assembly 10 by clamping the strap hooks 53, 54 and 55, 56 in the appropriate strap openings 17. This can be done without the aid of special tools, by merely forcing the hooks over the tops of the legs 11 and allowing them to snap into position in the opening 17.

FIG. 4 shows a modified form of hook for the drum support straps. This type hook has a foot 61 which lies adjacent the flange of the leg 11 and a clamp finger 62 which passes into the strap opening 17 formed in the leg 11. This type strap hook is also of the snap-on variety which can be assembled or disassembled from the leg 11 without the aid of tools.

The bottom of the legs 11 are provided with base plates 65. The base plates 65 have S-shaped locking toes 66 (FIG. 9) which extend transversely from the central portion of the plane surface thereof and engage within the base plate apertures 19 formed within the lower extremities of the legs 11. The base plates 65 are also readily attachable and detachable from the legs 11.

*Assembly and operation*

The folding drum rack assembly 10 is initially assembled at the factory. This assembly includes placing the slides 45 and 35 on each of the legs 11, and tying the legs together by the cross-braces 25 through 28, and 25a through 28a with pivotal connections placed at the proper pivot points as previously described. This assembly results in a unit substantially similar to that shown in FIG. 2, except with the base plates 65 removed.

The assembly 10 is packaged in this manner, including the drum support straps 50 and 51, the base plates 65, and the lock pins 16 in the package.

In operation or final assembly, the customer expands the assembly 10 from the FIG. 2 position to a position substantially as shown in FIG. 1. The pivotal connections of the scissorlike cross-braces pivotally secured to the upper extremities of the legs 11 and to the slides 35 and 45, readily allows such an expansion. Also, the slides 45 and 35 will move upwardly on the legs 11, allowing further expansion of the legs.

This expansion is limited by the stops 14 located on the legs 11. Thus, the slides 45 and 35 are allowed to move upwardly until the slides 45 abut the stop 14. The slides 35 will abut the bottom ends of slides 45 which prevents their further movement, as shown in FIG. 6.

The lock pins 16 can then be inserted in the lock apertures 15 formed in the leg 11. This positively locks the slides 45 and 35 between the stops 14 and the pins 16, preventing any further sliding movement of the slides on the legs. The pins 16 may be used in a permanent or temporary installation; however, they are particularly desirable in a permanent installation.

The drum support straps 50 and 51 are then secured to the legs 11 by snapping the strap hooks 53 and 54 of drum support straps 50, and 55 and 56 of drum support strap 51 in the appropriate strap openings 17 formed in the tops of the leg 11. The straps will lie upon the contour surfaces 18 formed on the tops of the leg 11.

The base plates 65 are then secured into position on the legs 11 by snapping the S-shaped locking toe 66 into position in the aperture 19 formed in the leg. The drum support rack is now fully assembled and in position to support a drum.

Disassembly takes place in the reverse manner; however, the drum support straps 50 and 51 may be removed before the base plate 65 if so desired.

It can be seen that the invention disclosed herein provides a folding drum rack which is readily adaptable to the use of mobile home owners. The rack can be quickly assembled and disassembled without the aid of tools. It collapses into a small, compact unit which is readily portable. The assembly is extremely simple and can be accomplished by the most inept individuals. It is of rugged construction and will withstand the normal use of any drum support rack. The legs can be positively locked in the expanded position, thus preventing the possibility of collapse under the weight of the drum. The rack can be manufactured at a cost substantially equal to that of a rack secured together by a multiplicity of nuts and bolts and other type fasteners, and provides the added advantages above mentioned.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressly state otherwise.

I claim:
1. A folding drum rack comprising angular legs disposed in a quadrangular relationship; scissorlike braces pivotally secured to each one of the upper or lower extremities of said legs, said braces being pivotally secured to slide members slidably mounted on the other extremities of said legs; said legs at their upper extremities being arranged in pairs with the legs of each pair having a side surface with an aperture therethrough below the top thereof; at least two straps, one spanning each pair of legs, said apertures substantially corresponding in shape to the cross-section of said straps; the ends of said straps being a hook having a portion extending over and engaged with the top of said legs and a portion extending downwardly and then inwardly through said apertures.

2. A folding drum rack comprising angular legs disposed in a quadrangular relationship; scissorlike braces pivotally secured to each one of the upper or lower extremities of said legs, said braces being pivotally secured to slide members slidably mounted on the other extremities of said legs; said legs at their upper extremities being arranged in pairs with the legs of each pair having a side surface with an aperture therethrough below the top thereof, said legs also having sides arranged transversely with respect to said first mentioned sides, the tops of said transverse sides of each pair of legs being inclined downwardly and toward each other; at least two straps, one spanning each pair of legs, said apertures substantially corresponding in shape to the cross-section of said straps, the ends of said straps being a hook having a portion extending over and engaged with the inclined tops of said legs and a portion extending downwardly and then inwardly through said apertures.

3. A folding drum rack comprising angular legs disposed in a quadrangular relationship; scissorlike braces pivotally secured to each one of the upper or lower extremities of said legs, said braces being pivotally secured to slide members slidably mounted on the other extremities of said legs; said slide members being of an angular configuration similar to said legs and having guide lips surrounding the edges of said legs for guiding and retaining said slide members on said legs; said legs at their upper extremities being arranged in pairs with the legs of each pair having a side surface with an aperture therethrough below the top thereof; at least two straps, one spanning each pair of legs, said apertures substantially corresponding in shape to the cross-section of said straps; the ends of said straps being a hook having a portion extending over and engaged with the top of said legs and a portion extending downwardly and then inwardly through said apertures.

References Cited in the file of this patent

UNITED STATES PATENTS

| | | |
|---|---|---|
| 1,008,545 | Humphrey | Nov. 14, 1911 |
| 1,261,761 | Bush | Apr. 8, 1918 |
| 1,863,442 | Goodman | June 14, 1932 |
| 2,702,727 | Sweet | Feb. 22, 1955 |
| 2,903,220 | Pastor | Sept. 8, 1959 |

FOREIGN PATENTS

| | | |
|---|---|---|
| 658,873 | Great Britain | Oct. 17, 1951 |